US012330700B2

(12) United States Patent  
Liktor et al.

(10) Patent No.: US 12,330,700 B2  
(45) Date of Patent: Jun. 17, 2025

(54) DIGITAL TRAIN DETERMINATION ASSISTANT

(71) Applicant: KNORR-BREMSE SYSTEME FÜR SCHIENENFAHRZEUGE GMBH, Munich (DE)

(72) Inventors: Balazs Liktor, Budapest (HU); Istvan Hegedüs, Györ (HU); Lajos Gathy, Budapest (HU); Laszlo Kovacs, Verce (HU); Gabor Toth, Budapest (HU)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 198 days.

(21) Appl. No.: 18/266,585

(22) PCT Filed: Nov. 12, 2021

(86) PCT No.: PCT/EP2021/081543  
§ 371 (c)(1),  
(2) Date: Jun. 9, 2023

(87) PCT Pub. No.: WO2022/122303  
PCT Pub. Date: Jun. 16, 2022

(65) Prior Publication Data  
US 2024/0101171 A1    Mar. 28, 2024

(30) Foreign Application Priority Data  
Dec. 11, 2020  (EP) ..................................... 20213468

(51) Int. Cl.  
*B61L 15/00* (2006.01)  
*H04W 4/42* (2018.01)  
(Continued)

(52) U.S. Cl.  
CPC ....... *B61L 15/0081* (2013.01); *B61L 15/0027* (2013.01); *H04W 4/42* (2018.02); *H04W 84/005* (2013.01); *H04W 84/18* (2013.01)

(58) Field of Classification Search  
CPC .. B61L 15/0081; B61L 15/0027; H04W 4/42; H04W 84/005; H04W 84/18; H04L 67/12  
See application file for complete search history.

(56) References Cited

U.S. PATENT DOCUMENTS

2008/0129480 A1  6/2008  Gaughan et al.  
2016/0144875 A1* 5/2016  Kim ...................... B61L 25/021  
370/328  
2017/0021847 A1* 1/2017  LeFebvre .............. B61L 25/025

FOREIGN PATENT DOCUMENTS

EP           2323886 B1    4/2014  
WO      2015081278 A1    6/2015  
(Continued)

OTHER PUBLICATIONS

International Search Report and Written Opinion corresponding to PCT/EP2021/081543 dated Feb. 25, 2022.

*Primary Examiner* — Xiao En Mo  
(74) *Attorney, Agent, or Firm* — Barnes & Thornburg LLP

(57) ABSTRACT

A digital train brake testing and train preparation assistant uses a system, method, and computer program for determining a component parameter of a train. The system may include sensor nodes mounted to a respective part of the train, wherein the sensor nodes form a sensor network on a rail car, wherein railcars form a wireless mesh network, and wherein each of the sensor nodes is configured to collect data of the component of the respective part of the train and to publish the collected data into the wireless mesh network. The system may further include a server system configured to receive the published data of the wireless mesh network (Continued)

and to determine the component parameter of the train based on the received data. Furthermore, a user device for displaying a component parameter determined by a system, method, and computer program for determining a component parameter of a train is provided.

20 Claims, 1 Drawing Sheet

(51) Int. Cl.
*H04W 84/00* (2009.01)
*H04W 84/18* (2009.01)

(56) References Cited

FOREIGN PATENT DOCUMENTS

| | | | |
|---|---|---|---|
| WO | 2015100425 | A1 | 7/2015 |
| WO | 2018176072 | A1 | 10/2018 |
| WO | 2018201171 | A1 | 11/2018 |

* cited by examiner

DIGITAL TRAIN DETERMINATION ASSISTANT

CROSS REFERENCE AND PRIORITY CLAIM

This patent application is a U.S. National Phase of International Patent Application No. PCT/EP2021/081543 filed Nov. 12, 2021, which claims priority to European Patent Application No. 20213468.0, the disclosure of which being incorporated herein by reference in their entireties.

FIELD

Disclosed embodiments generally relate to a digital train determination assistant, and more particularly to a system, method, and computer program for determining a component parameter of a train. Furthermore, the disclosed embodiments relate to a user device for displaying a component parameter determined by a system, method, and computer program for determining a component parameter of a train.

BACKGROUND

Currently, inspection of components of a train is carried out manually. That is, testing personnel walks alongside the train and inspects the components to be determined, assessed or tested. Therein, the to-be determined, assessed, or tested components may be for example a brake system and/or the air supply system of the train. In particular, the to-be determined or to-be tested component may be a brake shoe. However, such manual inspections are time intense and error-prone since they rely on the skills of the testing personnel. Further, such manual inspections can only be carried out when the train is not in use, for example when the train is in a maintenance facility. Furthermore, the testing personnel needs to walk alongside the train and determines or tests the respective components of the train sequentially, one by one. That is, the testing personnel has no guidance as to where a problematic component may be situated alongside the train.

Notwithstanding, a train composition may be subject to change. For example, a locomotive may be coupled to a varying number of railcars depending on the freight to be transported. Furthermore, a number of railcars may be coupled to a varying number of locomotives depending on the freight to be transported. Therefore, a manual inspection carried out for a specific train composition may not be applicable to a different composition of a train. It is, therefore, the technical problem underlying the disclosed embodiments to provide a system, method, and computer program for determining a component parameter of a train that provides for faster and more reliable component determination of the train. In particular, the objective technical problem underlying the present invention is to provide a digital train determination assistant that provides for faster and more reliable component determination of a train.

SUMMARY

Disclosed embodiments provide a system for determining a component parameter of a train. Therein, the system may comprise a plurality of sensor nodes being mounted to a respective part of the train, wherein the plurality of sensor nodes form a wireless mesh network, and wherein each of the plurality of sensor nodes is configured to collect data of the component of the respective part of the train and to publish the collected data into the wireless mesh network. Further, the system may comprise a server configured to receive the published data of the wireless mesh network and to determine the component parameter of the train based on the received data.

BRIEF DESCRIPTION OF THE FIGURES

In the following detailed description, presently disclosed embodiments are further described with reference to the following figures.

DETAILED DESCRIPTION

Figure 1:
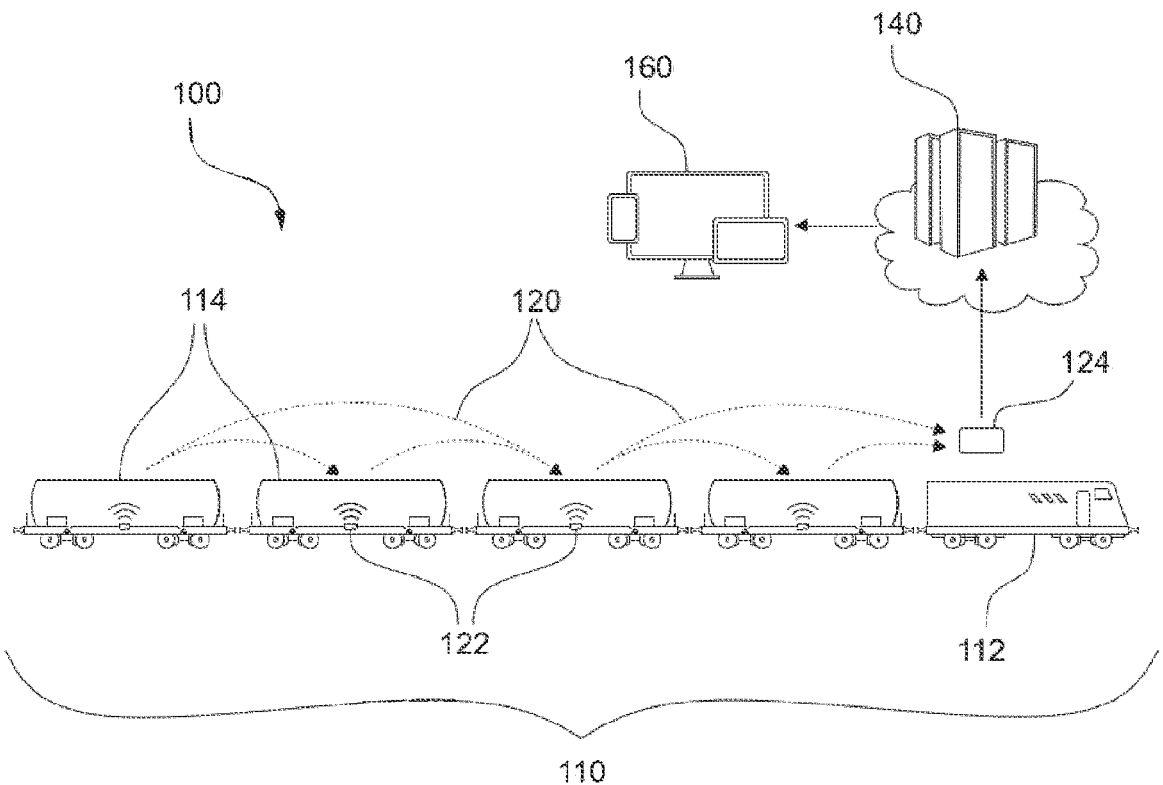
FIG. 1: A system overview of a system for determining a component parameter of a train according to an embodiment.

Accordingly, the system can determine a component parameter of the train based on collected data of a plurality of sensor nodes forming a wireless mesh network, wherein the collected data is accessible to a server being configured to determine the component parameter of the train based on the collected data published in the wireless mesh network. This way, a component parameter of the train can be determined without the need for manual inspections of the components of the parts of the train. That is, the component parameter of the train can be determined automatically by a wireless mesh network being used to collect the data and a server being configured to determine the component parameter based on the collected data of the wireless mesh network. This is particularly advantageous because testing personnel may get a guidance as to where a problematic component may be situated in the train. Furthermore, this is particularly advantageous when a train composition changes and no component parameter for the new train composition has been determined so far. Furthermore, this is also particularly advantageous because a component parameter of a train is subject to change over time even when the train composition may not change.

In a further functionality of the disclosed embodiments, the system may further comprise a gateway configured to relay the collected data, via direct or indirect wireless communication, of the plurality of sensor nodes to the server, optionally wherein the gateway is the single communication point between the server and the wireless mesh network. This way, the processing requirements of the sensor nodes can be reduced to a minimum, e.g., to only collecting and publishing the collected data into the wireless mesh network, whereas further processing steps can be offloaded to the gateway. Thus, battery life of the sensor nodes can be extended because the sensor nodes may be put into a hibernate mode when the sensor nodes do not collect and/or publish data to the wireless mesh network. Further, the gateway may be a sensor hub of a part of a train, in particular of a railcar as will be described further below. Furthermore, the gateway may be a handheld device, such as a laptop, tablet, or a computing device with a display device which is removable affixed to the computing device.

In another functionality of the disclosed embodiments, the gateway may be powered directly by the train. This is particularly advantageous since the gateway has the highest power requirements being the single communication point between the server and the wireless mesh network. This way, lifetime of the sensor nodes and thus of the wireless mesh network can be extended. Furthermore, a gateway can be fixatedly installed into or onto a specific part of the train, e.g., into the locomotive. This way, the electric power supply of the gateway can be provided by the locomotive itself. Furthermore, the gateway may act as default gateway for the wireless mesh network. This way, processing power for finding a consensus as to which node acts as gateway can be saved. Furthermore, the gateway may comprise a cellular communication module to communicate with the server. Accordingly, the resource intense operation of publishing and/or submitting the collected data to the server can be transferred from the sensor nodes to the gateway. This way, battery life of the sensor nodes can be extended.

In another functionality of the disclosed embodiments, the system may further comprise a user device, optionally a user device which may have the ability to act as a gateway as well, communicatively coupled to the server and configured to display the determined component parameter. Accordingly, the determined component parameter can be conveyed to the outside world, e.g., to a person inspecting the train such as testing personnel even in case such testing personnel is outside the locomotive cabin, on the tracks, or by the railcars to further improve guidance of the inspections. This way, determination of a component parameter of a train can be carried out in a more time efficient manner. Furthermore, determination of the component parameter of the train can be carried out without being subject to misinterpretations of a person inspecting the train. Furthermore, the determined component parameter can also be conveyed to a manufacturer of the train.

In yet another functionality of the disclosed embodiments, the user device may display the component parameter in a binary manner. Therein, binary is to be interpreted as having only two values, e.g., displaying an output in a red color may mean that the component parameter is out of a tolerance interval, whereas displaying an output in a green color may mean that the component parameter is inside of the tolerance interval. Alternatively, the user device may also display the component parameter in a more sophisticated graphical user interface, such as showing a numeric value of the determined component parameter or a diagram. By doing so, the determined component parameter of the train can be easily perceivable to the outside world, e.g., to testing personnel. In another functionality of the disclosed embodiments, the user device may be communicatively coupled to the wireless mesh network and may be able to determine the component parameter of the train based on the received data.

In yet another functionality of the disclosed embodiments of the system, the component may be a brake system of the part of the train. Alternatively, the component may be a compressor system of the part of the train. Furthermore, the component may be any component of the train being subject to change. Accordingly, the fundamental components of the train can be tested and/or monitored.

In a further functionality of the disclosed embodiments, the part of the train may be a railcar and/or a locomotive. This provides that the component parameter can be determined for a train in changing compositions. For example, the component parameter may be determined for a single locomotive being coupled to a varying number of railcars depending on the freight to be transported. Furthermore, the component parameter may be determined for a number of railcars being coupled to a varying number of locomotives depending on the freight to be transported.

In a further functionality of the disclosed embodiments, the server may be configured to store the received data to build a log of the received data. This way, the server can keep record of all, or only of a subset, of the received data. By doing so, a growing amount of received data can be used to determine the component parameter of the train. This provides for a more accurate determination of the component parameter of the train. Furthermore, erroneous measurements may be ignored based on the ever-growing amount of received data, for example by applying statistical analysis to the most recent measurement in comparison to the stored data at the server. In another functionality of the disclosed embodiments, the server may be configured to aggregate information based on the received data.

In yet a further functionality of the disclosed embodiments, the server may be further configured to extrapolate a future component parameter based on the stored log and/or the aggregated information. This way, a component parameter cannot only be determined retrospectively. Instead, a future component parameter can be extrapolated based on the collected data. This way, prognosis can be made based on the collected data of the wireless mesh network.

In a further functionality of the disclosed embodiments, the extrapolated future component parameter or the aggregated component parameter may be used to determine that maintenance of the train is necessary or to determine whether the system passes or fails criteria of a test, optionally wherein the test is a brake test. Furthermore, the extrapolated future component parameter may be used to determine possible future faults and/or reliability issues. This way, unnecessary maintenance labor at a maintenance facility can be avoided. Vice versa, unforeseeable reliability issues as well as possible future faults may be discovered before they actually occur. Accordingly, the reliability of the train can be improved.

In another functionality of the disclosed embodiments, the plurality of sensor nodes forming the wireless mesh network may not be able to influence the functioning of the respective component of the train. That is, the plurality of sensor nodes are passive sensors and cannot influence the operation of the components of the train, such as a brake system and/or a compressor system. Since the plurality of sensor nodes are only passive, negative interference of the sensor nodes, e.g., due to transmission errors or internal exceptions, with the components of the train can be avoided.

In yet another functionality of the disclosed embodiments, the component parameter may include a brake system status. The brake system status may for example comprise the status "applied" or "released". Accordingly, it can be determined whether a brake system of a part of the train is applied or released. The component parameter may include at least one pressure level of the brake system. The pressure level of the brake system may comprise a numeric value and a unit value. The component parameter may also include a valve status of the brake system. Such valve status may indicate a leakage or a fault detection. Furthermore, such valve status may indicate specific parameters of the valve. Notwithstanding the afore, the component parameter may also include a time measurement of the brake system. Such time measurement may include a release time and or a filling time of example given a compressor system of the train. Furthermore, the component parameter may also include a position of a switch. Such switch position may include the positions "on", "off", and/or a "G-P state". Accordingly, detailed information about the component parameter may be determined based on the collected data of the plurality of sensor nodes of the wireless mesh network.

In a further functionality of the disclosed embodiments, each of the plurality of sensor nodes may be configured to collect data of the component at an adjustable frequency.

This way, the resolution of the collected data can be adjusted. This may be particular advantageous since battery life of the wireless mesh network depends largely on the frequency of measurements carried out by the sender nodes. Accordingly, lifetime of the wireless mesh network can be advantageously adjusted to the needs of a train manufacturer, and/or a maintenance facility.

In a further functionality of the disclosed embodiments, the component parameter may comprise a component parameter for each part of the train. This is particularly advantageous since not only an overall component parameter can be determined but instead the parameter can be determined for each part of train. Accordingly, valuable information on each part of the train is provided. This information may be used to give testing personnel a guidance as to where a problematic component may be situated in the train. Accordingly, inspection times can be reduced.

In a further functionality of the disclosed embodiments, a method for determining a component parameter of a train is provided. Therein, the method may comprise collecting, by a plurality of sensor nodes being mounted to a respective part of the train, data of the component of the respective part of the train, wherein the plurality of sensor nodes form a wireless mesh network. The method may further comprise publishing, by the plurality of sensor nodes, the collected data into the wireless mesh network. The method may furthermore comprise determining, by a server configured to receive the published data of the wireless mesh network, the component parameter of the train based on the received data.

In further functionality of the disclosed embodiments, the above-described method may comprise additional features as described with regard to the system.

In yet a further functionality of the disclosed embodiments, a computer program is provided. Therein, the computer program comprises instructions, which when the program is executed by a computer, cause the computer to carry out the steps of the method as described above.

In yet another functionality of the disclosed embodiments, a user device for displaying a component parameter of the train is provided. Therein, the user device may be communicatively coupled to a server of a system or the wireless mesh network for determining a component parameter of a train as described above.

In the following, presently disclosed embodiments are described with respect to a digital train determination assistant. The approaches disclosed herein generally serve for providing a faster and more reliable component parameter determination or inspection of a train.

FIG. 1 shows a system overview of a system for determining a component parameter of a train according to an embodiment. System 100 comprises a train 110, a server 140 and a user device 160.

The train 110 comprises a locomotive 112 and a number of railcars 114. The railcars 114 comprise communication devices 122 optionally mounted on a distributor valve of a railcar 114. Therein, communication devices 122 may comprise sensor nodes and sensor hubs as will be described further below. A sensor node and/or a sensor hub is a node in a sensor network that is capable of performing processing, gathering sensory information and communicating with other connected nodes in the network. Generally, the main components of a sensor node are a microcontroller, transceiver, memory, power source and one or more sensors. The controller may perform tasks, process data and control the functionality of other components in the sensor node. The transceiver of a sensor node makes use of a wireless transmission media. Such wireless transmission media includes but is not limited to radio frequency (RF), optical communication (laser) and infrared transmission. The memory may be one of on-chip or off-chip memory. A power source usually comprises a battery, such as a NiCd (nickel-cadmium), NiZn (nickel-zinc), NiMH (nickel-metal hydride), or lithium-ion battery but it may be also possible to use the electric powerlines of railcars where present. The one or more sensors may be used to capture data from their environment, i.e. the component of the train to be determined, assessed, or inspected. In general, sensors are hardware devices that produce a measurable response to a change in a physical condition like a position of an object, e.g., a brake shoe, a temperature, or a pressure. Sensors measure physical data of the parameter to be determined and have specific characteristics such as accuracy, sensitivity etc. The analog signal produced by the sensor is digitized by an analog-to-digital converter and sent to a microcontroller for further processing.

Furthermore, the locomotive 112 may also comprise a communication device as described above which at the same time might act as a user device, e.g., a user device having a display which is optionally removable affixed to the computing device. In particular, the locomotive 112 may comprise a communication device acting as gateway 124 as will be described further below. The communication devices 122 and 124 form a sensor network 120. Therein, the sensor network 120 may be a wireless mesh network. A wireless mesh network is a communication network made up of radio nodes, in particular sensor nodes publishing data, and is organized in a mesh topology, wherein a mesh refers to rich interconnection among the sensor devices or sensor nodes. Each sensor node acts also as a provider forwarding data to a next sensor node. The networking infrastructure is decentralized and simplified because each node need only transmits at least as far as the next node. Wireless mesh networks often consist of mesh clients, such as sensor nodes 122 comprising sensor nodes and/or sensor hubs as will be described below, denoted as 222 and 226 respectively in FIG. 2 and mesh gateways, such as gateway 124 or a sensor node 122 acting as gateway.

As described above, the communication device of the locomotive 112 may be a gateway 124. A gateway is a piece of networking hardware used for a telecommunication network such as the sensor network 120 that allows data to flow from one network entity to another, e.g., from the wireless mesh network 120 to the server 140. Gateway functionality may also be implemented by software.

The gateway 124, which could alternatively be a sensor node 122 acting as gateway, is in communication with the server 140. In particular, the gateway 124 may act as single point of communication between the wireless mesh network and the server 140. When the gateway 124 is not present in the wireless mesh network 120, the communication device 122 may act as the single point of communication for the whole or selected part of the wireless mesh network 120 or for a single railcar sensor network. Therein, the gateway 124 and server 140 may use any transfer protocol to transfer the data, such as the Hypertext Transfer Protocol.

The server 140 may be a server implemented in hardware, or in software, or in combination of both. A server is a piece of computer hardware or software, e.g., computer program that provides functionality for other programs or devices. In the embodiment of FIG. 1, the server 140 is configured to receive the published data of the wireless mesh network 120 and to determine the component parameter of the train based on the received data from the wireless mesh network 120.

The server 140 may be communicatively coupled to a user device 160 or alternatively may be communicatively coupled to the gateway 124 acting as user device. The user device may be a mobile device, such as a smart phone, tablet, personal digital assistant, or the like. Furthermore, the user device may also be a computer, such as a laptop or a desktop computer. Furthermore, the user device may be a computing device with a display device which is removable affixed to the computing device. Furthermore, the user device 160 may be configured to perform a component test, and in particular a brake test. The brake test may be embodied by a specific application running on the user device 160 or gateway 124 acting as user device. Thus, the user device 160 or gateway 124 acting as user device may be a special device called brake test controller. Such brake test controller may be an integrated hardware and software solution which together perform the application embodying the brake test.

Figure 2:
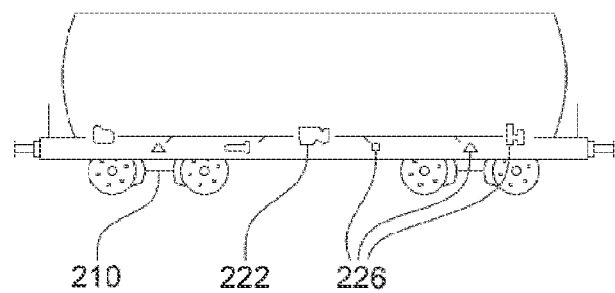
FIG. 2: A system overview of a system for determining a component parameter of a part of a train according to an embodiment.

FIG. 2 shows a system overview of a system for determining a component parameter of a part of a train according to an embodiment. In the specific example of FIG. 2, the part of the train is a railcar. However, the part of the train could alternatively be a locomotive. The railcar comprises a brake system 210, a communication device 222 which maybe a sensor node at the same time, and multiple sensor nodes 226. The communication device 222 can be a communication device as described with reference to FIG. 1. Therein, the communication device 222 may be affixed to a distributor valve of the railcar. Optionally, the distributor valve of the railcar is the distributor valve of a compressed air circuit. The multiple sensor nodes 226 may be sensor nodes as described with reference to FIG. 1. As can be seen, multiple sensor nodes can be mounted to a single part of the train, e.g., the railcar of FIG. 2. Therein, each of these sensor nodes 226 can determine a respective component parameter such as a parameter being associated with a brake system, a compressor system, as well as any other component being vital to the functioning of the railcar. Thus, the sensor nodes 226 can not only determine a single parameter per part of the train. Instead, multiple parameters can be determined for a respective part of the train. This way, a plurality of parameters can be determined for a respective part of the train as has been set forth above in detail. Furthermore, communication device 222 may be a sensor hub which acts as a gateway with respect to the sensor nodes 226. That is, communication device 222 receives and processes data collected from the sensor nodes 226. Thus, communication device 222, optionally being a sensor hub, is hierarchically above the sensor nodes 226 in terms of data communication paths.

The invention claimed is:

1. A system for determining a component parameter of a train, the system comprising:
a plurality of sensor nodes mounted to a respective part of the train, wherein the plurality of sensor nodes form a wireless mesh network, and wherein each of the plurality of sensor nodes is configured to collect data of the component of the respective part of the train and to publish the collected data into the wireless mesh network; and
a server configured to receive the published data of the wireless mesh network and to determine the component parameter of the train based on the received data.

2. The system of claim 1, further comprising a gateway configured to relay the collected data of the plurality of sensor nodes to the server, wherein the gateway is the single communication point between the server and the wireless mesh network.

3. The system of claim 2, wherein the gateway is powered directly by the train.

4. The system of claim 1, further comprising:
a user device communicatively coupled to the server and configured to display the determined component parameter,
wherein the user device displays the component parameter at least in a binary manner,
wherein the user device is communicatively coupled to the wireless mesh network and configured to determine the component parameter of the train based on the received data.

5. The system of claim 1, wherein the component is a brake system of the part of the train, and wherein the part of the train is a rail car and/or a locomotive.

6. The system of claim 1, wherein the server is configured to store the received data to build a log of the received data, or the server is configured to aggregate information based on the received data.

7. The system of claim 6, wherein the server is further configured to extrapolate a future component parameter based on the stored log and/or the aggregated information.

8. The system of claim 7, wherein the extrapolated future component parameter or aggregated component parameter is used to determine that maintenance of the train is necessary or to determine whether the system passes or fails criteria of a test, wherein the test is a brake test.

9. The system of claim 1, wherein the plurality of sensor nodes forming the wireless mesh network does not influence the functioning of the respective component of the train.

10. The system of claim 1, wherein the component parameter includes at least one of a brake system status, a pressure level of the brake system, a valve status of the brake system, a time measurement of the brake system, and a switch position of the brake system.

11. The system of claim 1, wherein each of the plurality of sensor nodes is configured to collect data of the component at an adjustable frequency.

12. The system of claim 1, wherein the component parameter comprises a component parameter for each part of the train.

13. A method for determining a component parameter of a train, comprising:
collecting, by a plurality of sensor nodes being mounted to a respective part of the train, data of the component of the respective part of the train, wherein the plurality of sensor nodes form a wireless mesh network;
publishing, by the plurality of sensor nodes, the collected data into the wireless mesh network; and
determining, by a server configured to receive the published data of the wireless mesh network, the component parameter of the train based on the received data.

14. A non-transitory computer readable medium including a computer program comprising instructions, which when the program is executed by a computer, cause the computer to carry out the operations of claim 13.

15. A user device for displaying a component parameter of a train, wherein the user device is communicatively coupled to a server of a system or the wireless mesh network for determining a component parameter of a train according to claim 1.

16. The method of claim 1, further comprising relaying the collected data of the plurality of sensor nodes to the server via a gateway that is the single communication point between the server and the wireless mesh network.

17. The method of claim 1, further comprising displaying the determined component parameter using a user device communicatively coupled to the server,
  wherein the user device displays the component parameter at least in a binary manner,
  wherein the user device is communicatively coupled to the wireless mesh network and configured to determine the component parameter of the train based on the received data.

18. The method of claim 1, further comprising storing the received data to build a log of the received data, or aggregating information based on the received data.

19. The method of claim 18, further comprising extrapolating a future component parameter based on the stored log and/or the aggregated information.

20. The method of claim 19, further comprising determine that maintenance of the train or determining whether the system passes or fails criteria of a brake test based on the extrapolated future component parameter or aggregated component parameter.

\* \* \* \* \*